(12) United States Patent
Jeon et al.

(10) Patent No.: US 11,287,031 B2
(45) Date of Patent: Mar. 29, 2022

(54) APPARATUS AND METHOD FOR SHIFT CONTROL IN VEHICLE

(71) Applicants: Hyundai Motor Company, Seoul (KR); Kia Motors Corporation, Seoul (KR)

(72) Inventors: Byeong Wook Jeon, Seoul (KR); Dong Hoon Jeong, Hwaseong-si (KR); Jae Chang Kook, Hwaseong-si (KR); Kwang Hee Park, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/938,326

(22) Filed: Jul. 24, 2020

(65) Prior Publication Data

US 2021/0172515 A1 Jun. 10, 2021

(30) Foreign Application Priority Data

Dec. 10, 2019 (KR) ........................ 10-2019-0164173

(51) Int. Cl.
| | | |
|---|---|---|
| *F16H 61/02* | (2006.01) | |
| *F16H 59/66* | (2006.01) | |
| *F16H 59/18* | (2006.01) | |
| *F16H 59/44* | (2006.01) | |
| *F16H 59/54* | (2006.01) | |
| *F16H 59/22* | (2006.01) | |

(52) U.S. Cl.
CPC ......... *F16H 61/0213* (2013.01); *F16H 59/22* (2013.01); *F16H 59/44* (2013.01); *F16H 59/54* (2013.01); *F16H 59/66* (2013.01); *F16H 2059/186* (2013.01); *F16H 2059/663* (2013.01); *F16H 2061/0227* (2013.01)

(58) Field of Classification Search
CPC ......... F16H 61/0213; F16H 2061/0227; F16H 59/22; F16H 59/44; F16H 59/54; F16H 59/66; F16H 2059/186; F16H 2059/663
See application file for complete search history.

(56) References Cited

U.S. PATENT DOCUMENTS

| | | | |
|---|---|---|---|
| 5,484,350 A * | 1/1996 | Ishikawa | ............. F16H 61/0213 477/97 |
| 5,544,053 A * | 8/1996 | Nakashima | ......... F16H 61/0213 180/170 |
| 10,363,929 B2 * | 7/2019 | Yamakado | .......... B60W 40/076 |
| 2015/0149052 A1 | 5/2015 | Jeong et al. | |

FOREIGN PATENT DOCUMENTS

| | | | |
|---|---|---|---|
| JP | 4849056 B2 | 12/2011 | |
| JP | 2017223324 A * | 12/2017 | ............. F16H 61/21 |
| KR | 101558350 B1 | 10/2015 | |
| KR | 101886535 B1 | 8/2018 | |

OTHER PUBLICATIONS

JP 2017223324 machine translation, filed Jun. 14, 2021 (Year: 2021).*

* cited by examiner

*Primary Examiner* — Tisha D Lewis
(74) *Attorney, Agent, or Firm* — Slater Matsil, LLP

(57) ABSTRACT

An apparatus for shift control in a vehicle is provided. The apparatus includes storage configured to store speed profiles corresponding to respective gears of the vehicle for each of a plurality of downhill slopes, and a controller configured to perform the shift control in the vehicle based on the speed profiles, when the vehicle coasts on a downhill road.

20 Claims, 7 Drawing Sheets

APPARATUS AND METHOD FOR SHIFT CONTROL IN VEHICLE

CROSS-REFERENCE TO RELATED APPLICATIONS

This application claims the benefit of Korean Patent Application No. 10-2019-0164173, filed in the Korean Intellectual Property Office on Dec. 10, 2019, which application is hereby incorporated herein by reference.

TECHNICAL FIELD

The present disclosure relates an apparatus and a method for shift control in a vehicle.

BACKGROUND

In general, to uniformly maintain the speed of a vehicle on a downhill road, a driver drives the vehicle without depressing an accelerator pedal and a brake pedal of the vehicle (hereinafter, referred to as coasting). Here, coasting is used as a concept including a turned-on state of a clutch as well as a turned-off state of the clutch (a state in which the vehicle is in N gear).

Because the slope of the downhill road is frequently changed, the speed of the vehicle coasting on the downhill road is also frequently changed. Accordingly, to uniformly maintain the speed of the vehicle, the driver has to depress the accelerator pedal when the speed of the vehicle is reduced by an engine brake, and the driver has to depress the brake pedal when the speed of the vehicle is increased due to a steep slope of the downhill road.

When the driver depresses the accelerator pedal, fuel consumption may be increased, and when the driver depresses the brake pedal, a brake pad may be worn or degraded. In addition, the driver may feel uncomfortable due to the situation of making the driver depress the accelerator pedal and the situation of making the driver depress the brake pedal.

The above information disclosed in this Background section is only for enhancement of understanding of the background of the present disclosure and therefore it may contain information that does not form any part of the prior art nor what the prior art may suggest to a person of ordinary skill in the art.

SUMMARY

The present disclosure relates an apparatus and a method for shift control in a vehicle. Particular embodiments relate to a technology for uniformly maintaining the speed of a vehicle by performing shift control in the vehicle when the vehicle coasts on a downhill road.

The present disclosure solves problems occurring in the prior art while advantages achieved by the prior art are maintained intact. An embodiment of the present disclosure provides a shift control apparatus and method for uniformly maintaining the speed of a vehicle without a driver's manipulation of an accelerator pedal or a brake pedal, by performing shift control in the vehicle, based on speed profiles corresponding to respective gears of the vehicle for each of a plurality of downhill slopes, when the vehicle coasts on a downhill road.

The technical problems to be solved by embodiments of the present disclosure are not limited to the aforementioned problems, and any other technical problems not mentioned herein will be clearly understood from the following description by those skilled in the art to which the present disclosure pertains. Also, it will be easily understood that the aspects and advantages of embodiments of the present disclosure can be accomplished by the means set forth in the appended claims and combinations thereof.

According to an embodiment of the present disclosure, an apparatus for shift control in a vehicle includes storage that stores speed profiles corresponding to respective gears of the vehicle for each of a plurality of downhill slopes and a controller that performs the shift control in the vehicle based on the speed profiles, when the vehicle coasts on a downhill road.

The controller may set at least one target position on the downhill road and may perform the shift control in the vehicle to satisfy a target speed at the target position.

The controller may set a target distance, based on a current speed of the vehicle and may set a target position corresponding to the target distance.

The controller may classify the current speed of the vehicle into three areas $A_1$, $A_2$, and $A_3$, may set the target distance to a first value in the area $A_1$, may set the target distance in proportion to the current speed of the vehicle in the area $A_2$, and may set the target distance to a second value in the area $A_3$.

The controller may calculate an average value of vehicle speeds for an initial reference period of time while the vehicle coasts, and may set the target speed by adding an error range to the average value.

The controller may start to set the target speed when a vehicle speed change is less than a reference vehicle speed change.

The controller may determine a gear satisfying the target speed at the target position, based on the speed profiles, when the vehicle coasts on the downhill road.

The controller may determine a lower one of the determined gear and a pattern gear to be a final gear.

When the gear satisfying the target speed at the target position is not present, the controller may determine the gear satisfying the target speed at the target position, by periodically determining whether the gear satisfying the target speed at the target position is present, while the vehicle coasts on the downhill road.

The apparatus may further include an Accelerator Position Sensor (APS) that measures an APS value representing a degree to which an accelerator pedal included in the vehicle is depressed, a Brake Position Sensor (BPS) that measures a BPS value representing a degree to which a brake pedal included in the vehicle is depressed, and an information collection device that collects a slope of a road ahead on which the vehicle travels.

The controller may determine the road ahead to be a downhill road when the slope collected by the information collection device is less than a reference slope.

The controller may determine that the vehicle coasts when the APS value is equal to 0 and the BPS value is equal to 0.

According to another embodiment of the present disclosure, a method for shift control in a vehicle includes storing, by storage, speed profiles corresponding to respective gears of the vehicle for each of a plurality of downhill slopes and performing, by a controller, the shift control in the vehicle, based on the speed profiles, when the vehicle coasts on a downhill road.

The performing of the shift control in the vehicle may include setting at least one target position on the downhill road and determining a gear satisfying a target speed at the target position.

The setting of the target position may include setting a target distance, based on a current speed of the vehicle and setting a target position corresponding to the target distance.

The setting of the target distance may include classifying the current speed of the vehicle into three areas $A_1$, $A_2$, and $A_3$, setting the target distance to a first value in the area $A_1$, setting the target distance in proportion to the current speed of the vehicle in the area $A_2$, and setting the target distance to a second value in the area $A_3$.

The determining of the gear may include calculating an average value of vehicle speeds for an initial reference period of time while the vehicle coasts and setting the target speed by adding an error range to the average value.

The determining of the gear may include determining a lower one of the determined gear and a pattern gear to be a final gear.

The determining of the gear may include, when the gear satisfying the target speed at the target position is not present, determining the gear satisfying the target speed at the target position, by periodically determining whether the gear satisfying the target speed at the target position is present, while the vehicle coasts on the downhill road.

The performing of the shift control in the vehicle may include determining a road to be a downhill road, when a slope of the road on which the vehicle travels is less than a reference slope and determining that the vehicle coasts, when a driver does not manipulate an accelerator pedal and a brake pedal.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
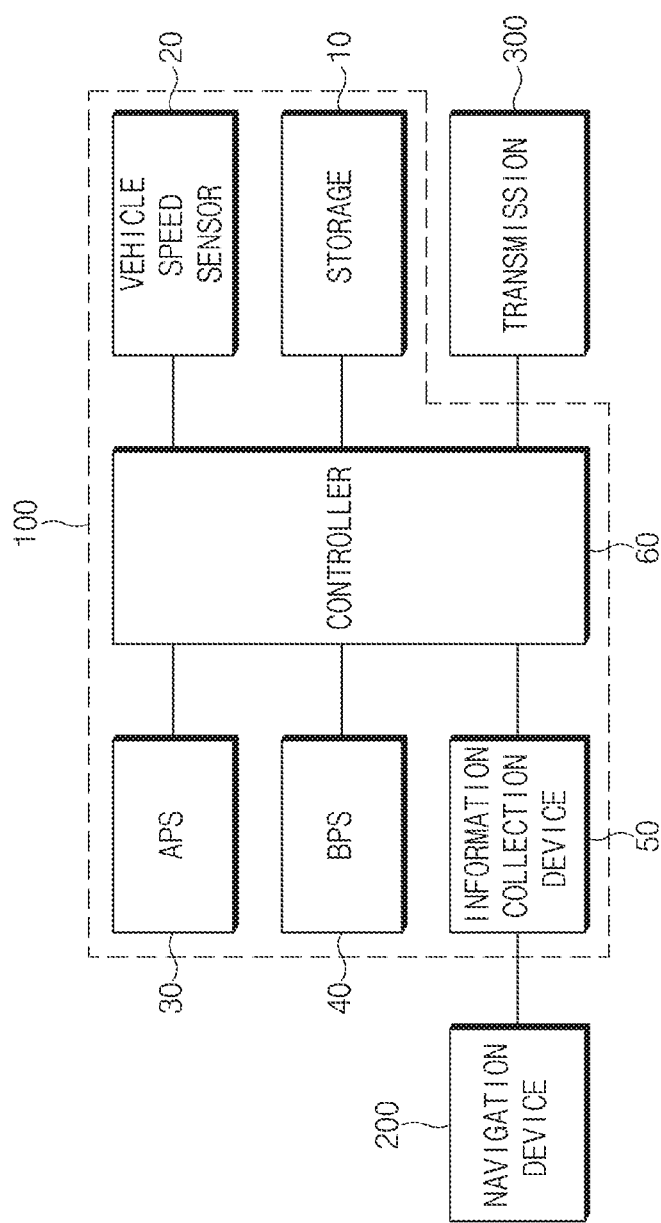
FIG. 1 is a view illustrating a configuration of a shift control apparatus for a vehicle according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiments of the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a configuration of a shift control apparatus for a vehicle according to an embodiment of the present disclosure.

As illustrated in FIG. 1, the shift control apparatus 100 for the vehicle according to an embodiment of the present disclosure may include storage 10, a vehicle speed sensor 20, an Accelerator Position Sensor (APS) 30, a Brake Position Sensor (BPS) 40, an information collection device 50, and a controller 60. Depending on a way of carrying out the shift control apparatus 100 for the vehicle according to an embodiment of the present disclosure, the components may be combined together to form one entity or some of the components may be omitted.

The storage 10 may store various logics, algorithms, and programs required in a process of performing shift control in the vehicle, based on speed profiles corresponding to respective gears of the vehicle for each of a plurality of downhill slopes, when the vehicle coasts on a downhill road. For reference, coasting is used as a concept including both a state in which a clutch is turned off (the vehicle is in N (Neutral) gear) while a driver does not manipulate an accelerator pedal (APS value=0) and does not manipulate a brake pedal (BPS value=0) and a state in which the clutch is turned on while the driver does not manipulate the accelerator pedal (APS value=0) and does not manipulate the brake pedal (BPS value=0).

The storage 10 may store the speed profiles corresponding to the respective gears of the vehicle for each of the downhill slopes, the speed profiles being applied when the vehicle coasts on a downhill road.

Figure 2:
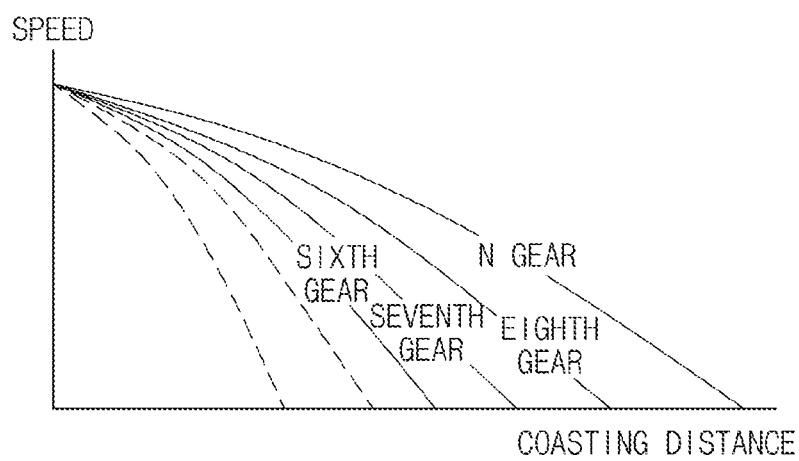
FIG. 2 is an exemplary view illustrating speed profiles provided in the shift control apparatus for the vehicle, according to an embodiment of the present disclosure.

For example, as illustrated in FIG. 2, the storage 10 may store speed profiles corresponding to the respective gears of the vehicle for a first slope.

FIG. 2 is an exemplary view illustrating speed profiles provided in the shift control apparatus for the vehicle, according to an embodiment of the present disclosure.

As illustrated in FIG. 2, the vertical axis represents initial speed, and the horizontal axis represents coasting distance. Through FIG. 2, it can be seen that when the initial speed is the same, the coasting distance is longer in a higher gear and longest in Neutral (N) gear.

The storage 10 may store a reference slope (e.g., −5%) and a reference distance (e.g., 300 m) as conditions for starting shift control in the vehicle.

The storage 10 may store a reference vehicle speed change (e.g., 10 KPH/sec or 2.8 m/sec).

The storage 10 may store a map in which gears (pattern gears) corresponding to patterns are recorded. The map is a well-known and common technology generally applied to a vehicle and is not the subject matter of embodiments of the present disclosure. Therefore, detailed description thereof will be omitted.

The storage 10 may store a target distance (e.g., 100 m) that represents the distance from the current position of the vehicle to a target position. The target distance may be varied depending on the current speed of the vehicle.

The storage 10 may store a reference speed range (e.g., 40 KPH to 150 KPH) of the vehicle.

The storage 10 may include at least one type of storage medium among memories of a flash memory type, a hard disk type, a micro type, and a card type (e.g., a Secure Digital (SD) card or an eXtream Digital (XD) card) and memories of a Random Access Memory (RAM) type, a Static RAM (SRAM) type, a Read-Only Memory (ROM) type, a Programmable ROM (PROM) type, an Electrically Erasable PROM (EEPROM) type, a Magnetic RAM (MRAM) type, a magnetic disk type, and an optical disk type.

The vehicle speed sensor 20 may measure the speed of the vehicle. In an embodiment of the present disclosure, it has been exemplified that the speed of the vehicle is directly measured through the vehicle speed sensor 20. However, in another embodiment, the speed of the vehicle may be obtained through a vehicle network. The vehicle network may include a Controller Area Network (CAN), a Local Interconnect Network (LIN), FlexRay, Media Oriented Systems Transport (MOST), Ethernet, or the like.

The APS 30 is a sensor for measuring the degree (hereinafter, referred to as the APS value) to which the accelerator pedal included in the vehicle is depressed. When the driver does not manipulate the accelerator pedal, the APS value is 0%, and when the driver fully depresses the accelerator pedal, the APS value is 100%. In an embodiment of the present disclosure, it has been exemplified that the APS value is directly measured through the APS 30. However, in another embodiment, the APS value may be obtained through the vehicle network.

The BPS 40 is a sensor for measuring the degree (hereinafter, referred to as the BPS value) to which the brake pedal included in the vehicle is depressed. When the driver does not manipulate the brake pedal, the BPS value is 0%, and when the driver fully depresses the brake pedal, the BPS value is 100%. In an embodiment of the present disclosure, it has been exemplified that the BPS value is directly measured through the BPS 40. However, in another embodiment, the BPS value may be obtained through the vehicle network.

The information collection device 50 is a module that operates in conjunction with a navigation device 200 included in the vehicle. The information collection device 50 may collect, from the navigation device 200, current position information (e.g., GPS information) of the vehicle and the slope of a road ahead on which the vehicle travels.

The information collection device 50 may additionally collect, from the navigation device 200, curvature information of the road ahead, the current speed of the vehicle, and a target position corresponding to a target distance.

The information collection device 50 may obtain information about the distance between the current position of the vehicle and the target position from the navigation device 200 in real time.

The controller 60 performs overall control to enable the components to normally perform functions thereof. The controller 60 may be implemented in the form of hardware or software, or in a combination thereof. The controller 60 may preferably be implemented with, but is not limited to, a microprocessor.

In particular, the controller 60 may perform various controls in a process of performing shift control in the vehicle, based on the speed profiles corresponding to the respective gears of the vehicle for each downhill slope, when the vehicle coasts on a downhill road.

The controller 60 may control the information collection device 50 to obtain, from the navigation device 200, the slope of a road ahead on which the vehicle travels. The controller 60 may determine whether the slope obtained by the information collection device 50 exceeds the reference slope.

The controller 60 may determine whether the vehicle coasts or not, based on an APS value measured by the APS 30 and a BPS value measured by the BPS 40. That is, when the APS value measured by the APS 30 is equal to 0 and the BPS value measured by the BPS 40 is equal to 0, the controller 60 may determine that the vehicle coasts.

The controller 60 may determine whether the vehicle speed measured by the vehicle speed sensor 20 is within the reference speed range.

The controller 60 may start to set a target speed when the vehicle speed change measured by the vehicle speed sensor 20 is less than the reference vehicle speed change.

Figure 3:
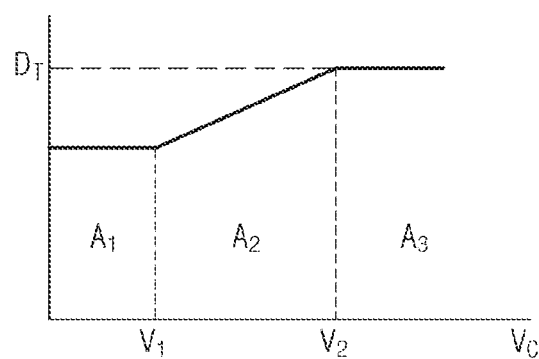
FIG. 3 is a view illustrating a target distance depending on the current speed of the vehicle that is provided in the shift control apparatus for the vehicle, according to an embodiment of the present disclosure.

The controller 60 may set a target distance, based on a map in which target distances are recorded based on the current speed of the vehicle as illustrated in FIG. 3.

FIG. 3 is a view illustrating a target distance depending on the current speed of the vehicle that is provided in the shift control apparatus for the vehicle, according to an embodiment of the present disclosure.

As illustrated in FIG. 3, the controller 60 may classify the current speed $V_c$ of the vehicle into three areas $A_1$, $A_2$, and $A_3$ and may set target distances DT corresponding to the areas $A_1$, $A_2$, and $A_3$.

The area $A_1$ may be an area in which the current speed of the vehicle is lower than $V_1$. In the area $A_1$, a target distance may be set to one constant value. The area $A_2$ may be an area in which the current speed of the vehicle is higher than or equal to $V_1$ and lower than $V_2$. In the area $A_2$, a target distance may be set to a value corresponding to the current speed of the vehicle. The area $A_3$ may be an area in which the current speed of the vehicle is higher than or equal to $V_2$. In the area $A_3$, a target distance may be set to one constant value.

The controller 60 may set a target speed $V_T$ of the vehicle that is desired to be maintained at a target position. That is, the controller 60 may set the target speed $V_T$ at the target position by calculating the average of vehicle speeds for a reference period of time (e.g., 1 second) from the time when the vehicle is determined to coast and applying an error range for control stabilization (computational complexity reduction) to the calculated average. For example, when the average vehicle speed is 80 KPH and the error range is 3 KPH, the controller 60 may set the target velocity $V_T$ at the target position to 77 KPH to 83 KPH.

Hereinafter, a process in which the controller 60 determines a gear when the vehicle coasts on a downhill road will be described in detail with reference to FIGS. 4 and 5.

Figure 4:
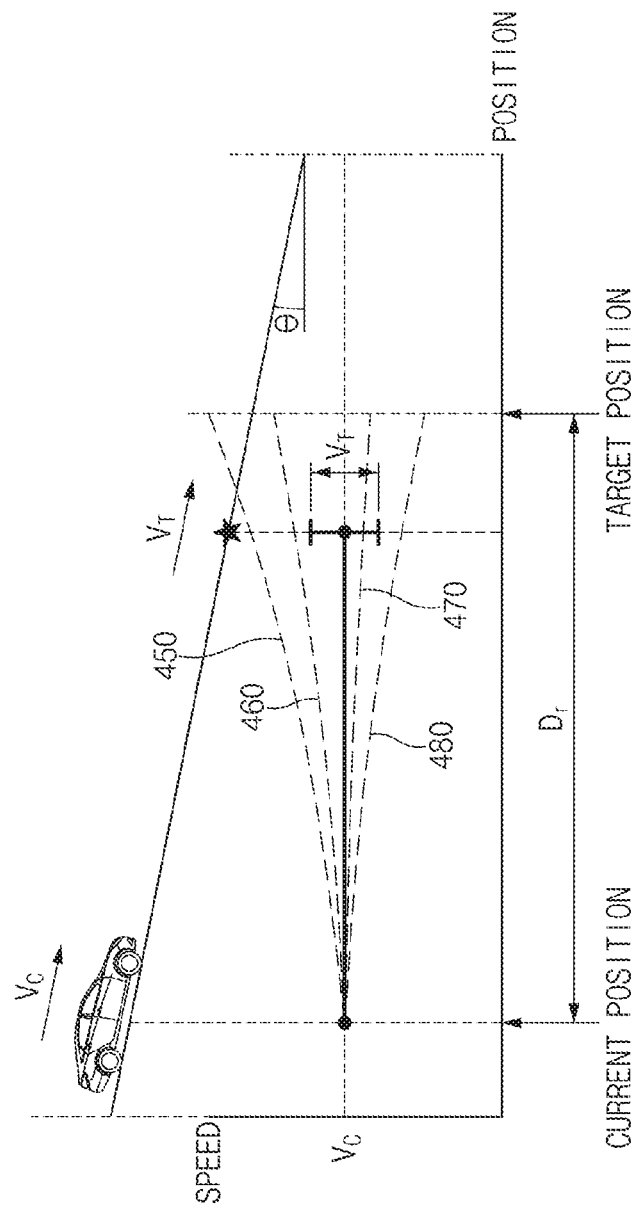
FIG. 4 is a view illustrating a process in which a controller included in the shift control apparatus for the vehicle determines a gear when the vehicle coasts on a downhill road, according to an embodiment of the present disclosure.

FIG. 4 is a view illustrating a process in which the controller included in the shift control apparatus for the vehicle determines a gear when the vehicle coasts on a downhill road, according to an embodiment of the present disclosure.

As illustrated in FIG. 4, the vehicle starts to coast on a downhill road. The vehicle speed at the current position is $V_c$, and a target speed $V_T$ at a target position is set.

The controller 60 detects a gear satisfying the target speed $V_T$ at the target position, based on the speed profiles stored in the storage 10, the speed profiles corresponding to the respective gears of the vehicle for each downhill slope.

In FIG. 4, the gear satisfying the target speed $V_T$ at the target position is seventh gear. Accordingly, when the vehicle is in seventh gear at the current position, the controller 60 maintains the current gear, and when the vehicle is not in seventh gear at the current position, the controller 60 controls a transmission 300 to be shifted into seventh gear.

Figure 5:
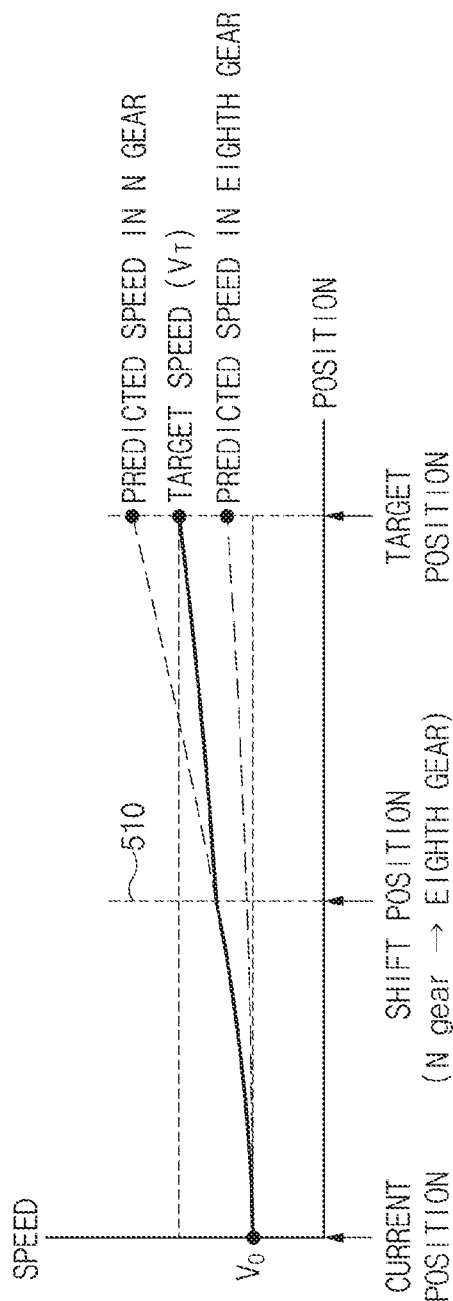
FIG. 5 is a detailed view illustrating a process in which the controller included in the shift control apparatus for the vehicle determines a gear when the vehicle coasts on a downhill road, according to an embodiment of the present disclosure.

Meanwhile, when a gear satisfying the target speed $V_T$ at the target position is not present at the current position, the controller 60, as illustrated in FIG. 5, may periodically (e.g., with a period of 10 ms, 100 ms, or the like) determine whether a gear satisfying the target speed $V_T$ at the target position is present, while the vehicle coasts on the downhill road.

FIG. 5 is a detailed view illustrating a process in which the controller included in the shift control apparatus for the vehicle determines a gear when the vehicle coasts on a downhill road, according to an embodiment of the present disclosure.

As illustrated in FIG. 5, when a gear satisfying the target speed $V_T$ at the target position is not present at the current position, that is, when the speed at the target position that is predicted in a case of a shift into N gear at the current position exceeds the target speed $V_T$ and the speed at the target position that is predicted in a case of a shift into eighth gear at the current position is lower than the target speed $V_T$, the controller 60 periodically determines whether a gear satisfying the target speed $V_T$ at the target position is present.

In FIG. 5, it can be seen that at point 510, a gear (a predicted gear) satisfying the target speed $V_T$ at the target position is eighth gear. Accordingly, the controller 60 may control the transmission 300 to be shifted into eighth gear at point 510 (the shift position). At this time, the controller 60 may set a lower one of the predicted gear and a pattern gear to the final gear.

The controller 60 may perform the above-described process while consistently updating the target position depending on the target distance, thereby uniformly maintaining the speed of the vehicle when the vehicle coasts on the downhill road.

For reference, a shift control method for a vehicle according to an embodiment of the present disclosure has to be distinguished from a technology for performing shift control in a vehicle such that the current speed of the vehicle simply coincides with a target speed, without setting a target position depending on a target distance. The aforementioned technology very frequently performs the shift control to allow the current speed of the vehicle to coincide with the target speed. Therefore, the technology causes a failure in a transmission and reduces the lifetime of the transmission. As a result, the technology is difficult to apply to an actual vehicle.

Figure 6:
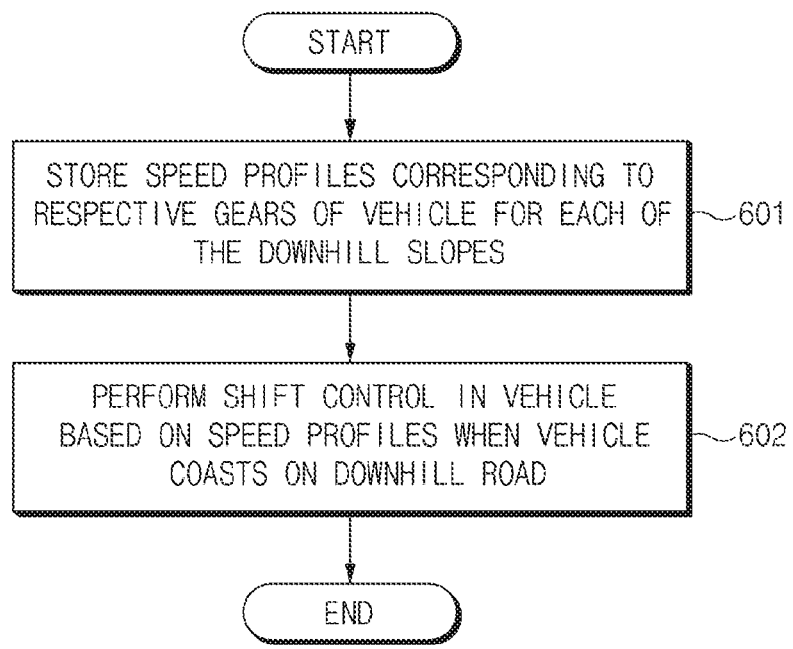
FIG. 6 is a flowchart illustrating a shift control method for a vehicle according to an embodiment of the present disclosure.

FIG. 6 is a flowchart illustrating the shift control method for the vehicle according to an embodiment of the present disclosure.

The storage 10 stores speed profiles corresponding to respective gears of the vehicle for each of a plurality of downhill slopes (601).

Thereafter, when the vehicle coasts on a downhill road, the controller 60 performs shift control in the vehicle, based on the speed profiles (602).

Figure 7:
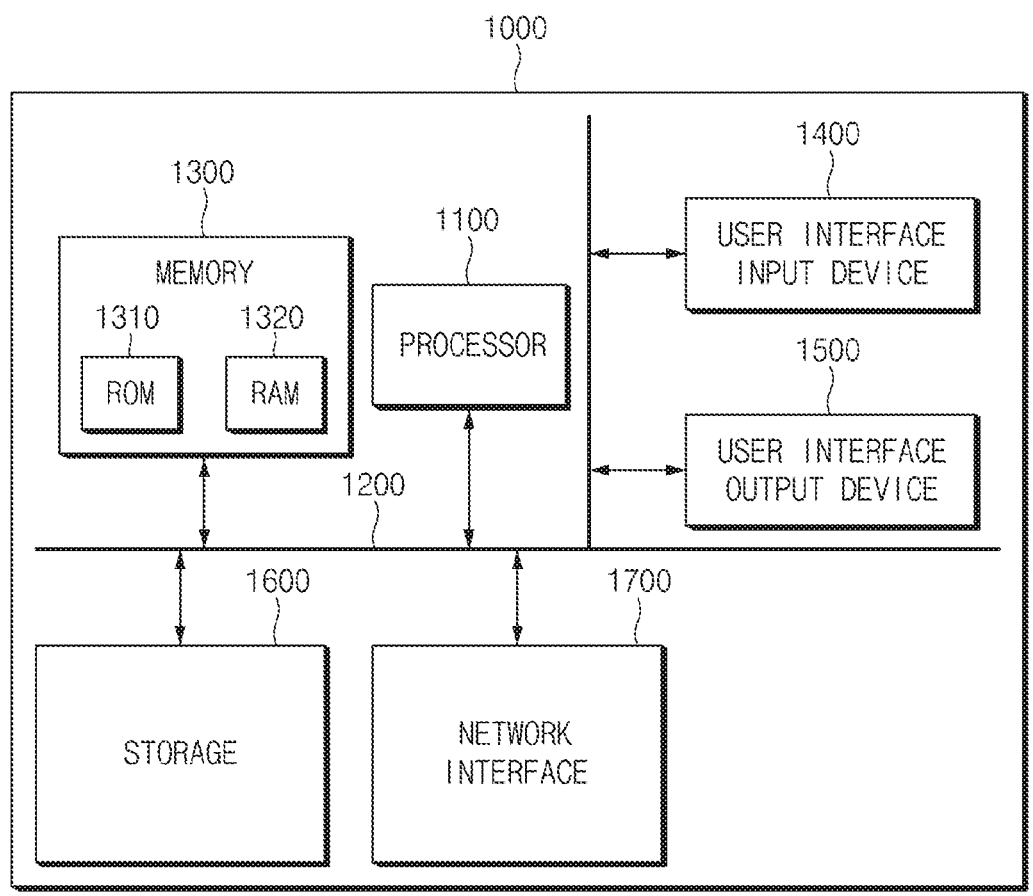
FIG. 7 is a block diagram illustrating a computing system for executing the shift control method for the vehicle, according to an embodiment of the present disclosure.

FIG. 7 is a block diagram illustrating a computing system for executing the shift control method for the vehicle, according to an embodiment of the present disclosure.

Referring to FIG. 7, the above-described shift control method for the vehicle according to an embodiment of the present disclosure may be implemented through the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a Central Processing Unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an Application Specific Integrated Circuit (ASIC). The ASIC may reside within a user terminal. In another case, the processor 1100 and the storage medium may reside in the user terminal as separate components.

As described above, according to the embodiments of the present disclosure, when the vehicle coasts on a downhill road, the shift control apparatus and method for the vehicle performs shift control in the vehicle, based on the speed profiles corresponding to the respective gears of the vehicle for each downhill slope, thereby uniformly maintaining the speed of the vehicle without the driver's manipulation of the accelerator pedal and the brake pedal.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An apparatus for shift control in a vehicle, the apparatus comprising:
   storage configured to store speed profiles corresponding to respective gears of the vehicle for each of a plurality of downhill slopes; and
   a controller configured to perform the shift control in the vehicle based on the speed profiles, when the vehicle coasts on a downhill road,
   wherein the controller is configured to set at least one target position on the downhill road and perform the shift control in the vehicle to satisfy a target speed at the target position;
   wherein the controller is configured to set a target distance based on a current speed of the vehicle and set a target position corresponding to the target distance; and
   wherein the controller is configured to classify the current speed of the vehicle into three areas $A_1$, $A_2$, and $A_3$, set the target distance to a first value in the area $A_1$, set the target distance in proportion to the current speed of the vehicle in the area $A_2$, and set the target distance to a second value in the area $A_3$.

2. The apparatus of claim 1, wherein the controller is configured to determine a gear satisfying the target speed at the target position, based on the speed profiles, when the vehicle coasts on the downhill road.

3. The apparatus of claim 2, wherein the controller is configured to determine a lower one of the determined gear and a pattern gear to be a final gear.

4. The apparatus of claim 2, wherein when the gear satisfying the target speed at the target position is not present, the controller is configured to determine the gear satisfying the target speed at the target position, by periodically determining whether the gear satisfying the target speed at the target position is present, while the vehicle coasts on the downhill road.

5. The apparatus of claim 1, further comprising:
   an Accelerator Position Sensor (APS) configured to measure an APS value representing a degree to which an accelerator pedal included in the vehicle is depressed;
   a Brake Position Sensor (BPS) configured to measure a BPS value representing a degree to which a brake pedal included in the vehicle is depressed; and
   a navigation device configured to provide a slope of a road ahead on which the vehicle travels.

6. The apparatus of claim 5, wherein the controller is configured to determine the road ahead to be the downhill road when the slope collected by the navigation device is less than a reference slope.

7. The apparatus of claim 5, wherein the controller is configured to determine that the vehicle coasts when the APS value is equal to 0 and the BPS value is equal to 0.

8. An apparatus for shift control in a vehicle, the apparatus comprising:
   storage configured to store speed profiles corresponding to respective gears of the vehicle for each of a plurality of downhill slopes; and
   a controller configured to perform the shift control in the vehicle based on the speed profiles, when the vehicle coasts on a downhill road, wherein the controller is configured to set at least one target position on the downhill road and perform the shift control in the vehicle to satisfy a target speed at the target position and wherein the controller is configured to calculate an average value of vehicle speeds for an initial reference period of time while the vehicle coasts, and set the target speed by adding an error range to the average value.

9. The apparatus of claim 8, wherein the controller is configured to start to set the target speed when a vehicle speed change is less than a reference vehicle speed change.

10. The apparatus of claim 8, wherein the controller is configured to set a target distance based on a current speed of the vehicle and set a target position corresponding to the target distance.

11. The apparatus of claim 10, wherein the controller is configured to classify the current speed of the vehicle into three areas $A_1$, $A_2$, and $A_3$, set the target distance to a first value in the area $A_1$, set the target distance in proportion to the current speed of the vehicle in the area $A_2$, and set the target distance to a second value in the area $A_3$.

12. The apparatus of claim 8, further comprising:
   an Accelerator Position Sensor (APS) configured to measure an APS value representing a degree to which an accelerator pedal included in the vehicle is depressed;
   a Brake Position Sensor (BPS) configured to measure a BPS value representing a degree to which a brake pedal included in the vehicle is depressed; and
   a navigation device configured to provide a slope of a road ahead on which the vehicle travels.

13. The apparatus of claim 12, wherein the controller is configured to determine the road ahead to be the downhill road when the slope collected by the navigation device is less than a reference slope.

14. A method for shift control in a vehicle, the method comprising:
   reading speed profiles from a memory, the speed profiles corresponding to respective gears of the vehicle for each of a plurality of downhill slopes; and
   performing, by a controller, the shift control in the vehicle based on the speed profiles, when the vehicle coasts on a downhill road, wherein performing the shift control in the vehicle comprises setting at least one target position on the downhill road and determining a gear satisfying a target speed at the target position;
   wherein setting the target position comprises:
      setting a target distance based on a current speed of the vehicle; and
      setting a target position corresponding to the target distance; and
   wherein setting the target distance comprises:
      classifying the current speed of the vehicle into three areas $A_1$, $A_2$, and $A_3$;
      setting the target distance to a first value in the area $A_1$;
      setting the target distance in proportion to the current speed of the vehicle in the area $A_2$; and
      setting the target distance to a second value in the area $A_3$.

15. The method of claim 14, wherein determining the gear comprises determining a lower one of the determined gear and a pattern gear to be a final gear.

16. The method of claim 14, wherein performing the shift control in the vehicle comprises:
   determining a road to be the downhill road when a slope of the road on which the vehicle travels is less than a reference slope; and
   determining that the vehicle coasts when a driver does not manipulate an accelerator pedal and a brake pedal.

17. A method for shift control in a vehicle, the method comprising:
   reading speed profiles from a memory, the speed profiles corresponding to respective gears of the vehicle for each of a plurality of downhill slopes; and
   performing, by a controller, the shift control in the vehicle based on the speed profiles, when the vehicle coasts on a downhill road, wherein performing the shift control in the vehicle comprises setting at least one target position on the downhill road and determining a gear satisfying a target speed at the target position;
wherein determining the gear comprises:
  calculating an average value of vehicle speeds for an initial reference period of time while the vehicle coasts; and
  setting the target speed by adding an error range to the average value.

18. A method for shift control in a vehicle, the method comprising:
  reading speed profiles from a memory, the speed profiles corresponding to respective gears of the vehicle for each of a plurality of downhill slopes; and
  performing, by a controller, the shift control in the vehicle based on the speed profiles, when the vehicle coasts on a downhill road;
  wherein performing the shift control in the vehicle comprises setting at least one target position on the downhill road and determining a gear satisfying a target speed at the target position; and
  wherein determining the gear comprises, when the gear satisfying the target speed at the target position is not present, determining the gear satisfying the target speed at the target position by periodically determining whether the gear satisfying the target speed at the target position is present, while the vehicle coasts on the downhill road.

19. The method of claim 18, wherein setting the target position comprises:
  setting a target distance based on a current speed of the vehicle; and
  setting a target position corresponding to the target distance.

20. The method of claim 19, wherein setting the target distance comprises:
  classifying the current speed of the vehicle into three areas $A_1$, $A_2$, and $A_3$;
  setting the target distance to a first value in the area $A_1$;
  setting the target distance in proportion to the current speed of the vehicle in the area $A_2$; and
  setting the target distance to a second value in the area $A_3$.

* * * * *